United States Patent
Fuller et al.

(10) Patent No.: US 9,553,327 B2
(45) Date of Patent: Jan. 24, 2017

(54) GRAFTED FUNCTIONAL GROUPS ON EXPANDED TETRAFLUOROETHYLENE (EPTFE) SUPPORT FOR FUEL CELL AND WATER TRANSPORT MEMBRANES

(71) Applicant: GM Global Technology Operations LLC, Detroit, MI (US)

(72) Inventors: Timothy J. Fuller, Pittsford, NY (US); Ruichun Jiang, Rochester, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/586,132

(22) Filed: Dec. 30, 2014

(65) Prior Publication Data

US 2016/0190626 A1    Jun. 30, 2016

(51) Int. Cl.
*H01M 8/10* (2016.01)
*C08J 9/22* (2006.01)
*H01M 8/04* (2016.01)
*C08J 9/224* (2006.01)

(52) U.S. Cl.
CPC .......... *H01M 8/1088* (2013.01); *C08J 9/224* (2013.01); *H01M 8/04141* (2013.01); *H01M 8/04149* (2013.01); *H01M 8/1023* (2013.01); *H01M 8/1039* (2013.01); *C08J 2327/18* (2013.01); *H01M 8/1044* (2013.01); *H01M 8/1067* (2013.01); *H01M 2008/1095* (2013.01)

(58) Field of Classification Search
CPC .......... H01M 8/1088; H01M 8/1039; H01M 8/04149; H01M 2008/1095; C08J 9/224; C08J 2327/18
USPC ........................................................ 521/27
See application file for complete search history.

(56) References Cited

U.S. PATENT DOCUMENTS

| | | | |
|---|---|---|---|
| 6,471,195 B2 | 10/2002 | Shimanuki et al. | |
| 7,036,466 B2 | 5/2006 | Goebel et al. | |
| 7,156,379 B2 | 1/2007 | Tanihara et al. | |
| 7,572,531 B2 | 8/2009 | Forte | |
| 2006/0029837 A1 | 2/2006 | Sennoun et al. | |

FOREIGN PATENT DOCUMENTS

JP    2005307026 A   * 11/2005

OTHER PUBLICATIONS

Tang et al. "Fabrication and characterization of PFSI/ePTFE composite proton exchange membranes of polymer electrolyte fuel cells", Electrochimica Acta 52 (2007) 5304-5311.*
Tang et al. "Fabrication and characterization of PFSI/ePTFE composite proton exchange membranes of polymer electrolyte fuel cells", Electrochimica Acta 52 (2007), pp. 5304-5311.*
Fieser, L.F. et al., "Reagents for Organic Synthesis," vol. 1, John Wiley & Sons, New York, 1967, pp. 711-712.
Jiang, R. et al., "Through-Plane Proton Transport Resistance of Membrane and Ohmic Resistance Distribution in Fuel Cells," J. Electrochem. Soc., 156 (2009) B1440-B1446.
Lyssy, T.M., "Reaction of Metallic Sodium with Naphthalene. Dihydronaphthalenedicarboxylic Acids-1,4 and -1,2 and Related Compounds," J. Org. Chem., 27, 5-13 (1962).
Paul, D.E. et al., "Reactions of Sodium Metal with Aromatic Hydrocarbons", Amer. Chem. Soc., 78, 116-120 (1956).

* cited by examiner

*Primary Examiner* — Michael M Bernshteyn
(74) *Attorney, Agent, or Firm* — Brooks Kushman P.C.

(57) ABSTRACT

A method for forming a modified solid polymer includes a step of contacting a solid fluorinated polymer with a sodium sodium-naphthalenide solution to form a treated fluorinated solid polymer. The treated fluorinated solid polymer is contacted with carbon dioxide, sulfur dioxide, or sulfur trioxide to form a solid grafted fluorinated polymer. Characteristically, the grafted fluorinated polymer includes appended $CO_2H$ or $SO_2H$ or $SO_3H$ groups. The solid grafted fluorinated polymer is advantageously incorporated into a fuel cell as part of the ion-conducting membrane or a water transport membrane in a humidifier.

10 Claims, 7 Drawing Sheets

GRAFTED FUNCTIONAL GROUPS ON EXPANDED TETRAFLUOROETHYLENE (EPTFE) SUPPORT FOR FUEL CELL AND WATER TRANSPORT MEMBRANES

STATEMENT REGARDING FEDERALLY SPONSORED RESEARCH OR DEVELOPMENT

The invention was made with Government support under Agreement No. DE-EE0000470 awarded by the Department of Energy—Water Transport. The Government has certain rights to the invention.

TECHNICAL FIELD

The present invention is related to support and membranes for fuels cells and water vapor transport.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells as stacks in order to provide high levels of electrical power.

The internal membranes used in fuel cells are typically maintained in a moist condition. This helps avoid damage to, or a shortened life of, the membranes, as well as to maintain the desired efficiency of operation. For example, lower water content of the membrane leads to a higher proton conduction resistance, thus resulting in a higher ohmic voltage loss. The humidification of the feed gases, in particular the cathode inlet, is desirable in order to maintain sufficient water content in the membrane, especially in the inlet region. Humidification in a fuel cell is discussed in commonly owned U.S. patent application Ser. No. 10/797,671 (now U.S. Pat. No. 7,036,466) to Goebel et al.; commonly owned U.S. patent application Ser. No. 10/912,298 (now U.S. Patent Application Publication 2006/0029837) to Sennoun et al.; and commonly owned U.S. patent application Ser. No. 11/087,911 (now U.S. Pat. No. 7,572,531) to Forte, each of which is hereby incorporated herein by reference in its entirety.

To maintain a desired moisture level, an air humidifier is frequently used to humidify the air stream used in the fuel cell. The air humidifier normally consists of a round or box type air humidification module that is installed into a housing of the air humidifier. Examples of this type of air humidifier are shown and described in U.S. patent application Ser. No. 10/516,483 (now U.S. Pat. No. 7,156,379) to Tanihara et al., and U.S. Pat. No. 6,471,195, each of which is hereby incorporated herein by reference in its entirety. Membrane humidifiers have also been utilized to fulfill fuel cell humidification requirements. For the automotive fuel cell humidification application, such a membrane humidifier needs to be compact, exhibit low pressure drop, and have high performance characteristics.

Accordingly, there is a need for improved proton exchange and humidifier membranes.

SUMMARY

The present invention solves one or more problems of the prior art by providing, in at least one embodiment, a method for forming modified solid polymer. The method includes a step of contacting a solid fluorinated polymer with a sodium-naphthalenide solution to form a treated fluorinated solid polymer. The treated fluorinated solid polymer is contacted with carbon dioxide, sulfur dioxide, or sulfur trioxide to form a solid grafted fluorinated polymer. Characteristically, the grafted fluorinated polymer includes appended $CO_2H$ or $SO_2H$ or $SO_3H$ groups. The solid grafted fluorinated polymer is advantageously incorporated into a fuel cell as part of the ion-conducting membrane or a water transport membrane in a humidifier.

In another embodiment, a fuel cell incorporating the grafted solid polymers set forth above is provided. The fuel cell also includes a cathode layer, an anode layer, an ion-conducting layer interposed between the cathode layer and the anode layer, a first gas diffusion layer disposed over a cathode layer, a second gas diffusion layer disposed over the anode layer, a first flow field plate disposed over the first gas diffusion layer, and a second flow field plate disposed over the second gas diffusion layer.

In another embodiment, a membrane humidifier assembly incorporating the grafted solid polymers is provided. The membrane humidifier assembly includes a first flow field plate adapted to facilitate flow of a first gas thereto and a second flow field plate adapted to facilitate flow of a second gas thereto. A polymeric membrane is disposed between the first and second flow fields. The polymeric membrane is adapted to permit transfer of water between the first flow field plate and the second flow field plate. The polymeric membrane includes a polymeric substrate and a polymer layer disposed on the polymeric substrate. The polymer layer characteristically includes the grafted solid polymers set forth above.

DETAILED DESCRIPTION

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Abbreviations:

"ePTFE" means expanded polytetrafluoroethylene.

"FEP" means fluorinated ethylene propylene.

"mL" means milliliter.

"mol" means moles.

"RH" means relative humidity.

"s" means seconds.

Figure 1:
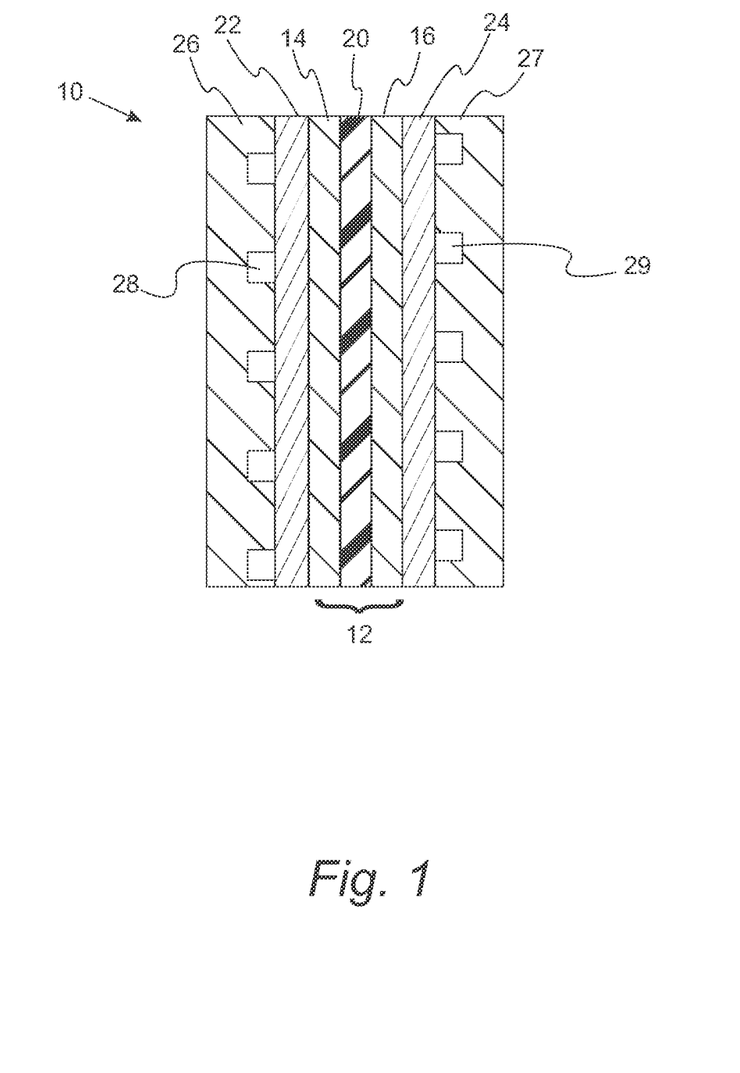
FIG. 1 provides a schematic illustration of a fuel cell incorporating an embodiment of a supported ion exchange membrane.

With reference to FIG. 1, a schematic cross section of a fuel cell that incorporates an embodiment of a grafted porous membrane is provided. Proton exchange membrane (PEM) fuel cell 10 includes polymeric ion conducting membrane 20 disposed between cathode catalyst layer 14 and anode catalyst layer 16. Collectively, the combination of the ion conducting membrane, cathode catalyst layer 14 and anode catalyst layer 16 are a membrane electrode assembly 12. Fuel cell 10 also includes flow field plates 26, 27, gas channels and gas diffusion layers 22 and 24. Advantageously, polymeric ion conducting membrane 20 includes a porous support such as expanded polytetrafluoroethylene grafted with moieties that increase the hydrophilicity. In such porous supports, an ion-conducting polymer is imbibed therein. Hydrogen ions are generated by anode catalyst layer 16 which migrate through polymeric ion conducting membrane 20 where they react at cathode catalyst layer 14 to form water. This electrochemical process generates an electric current through a load connected to flow field plates 26 and 27.

Figure 2:
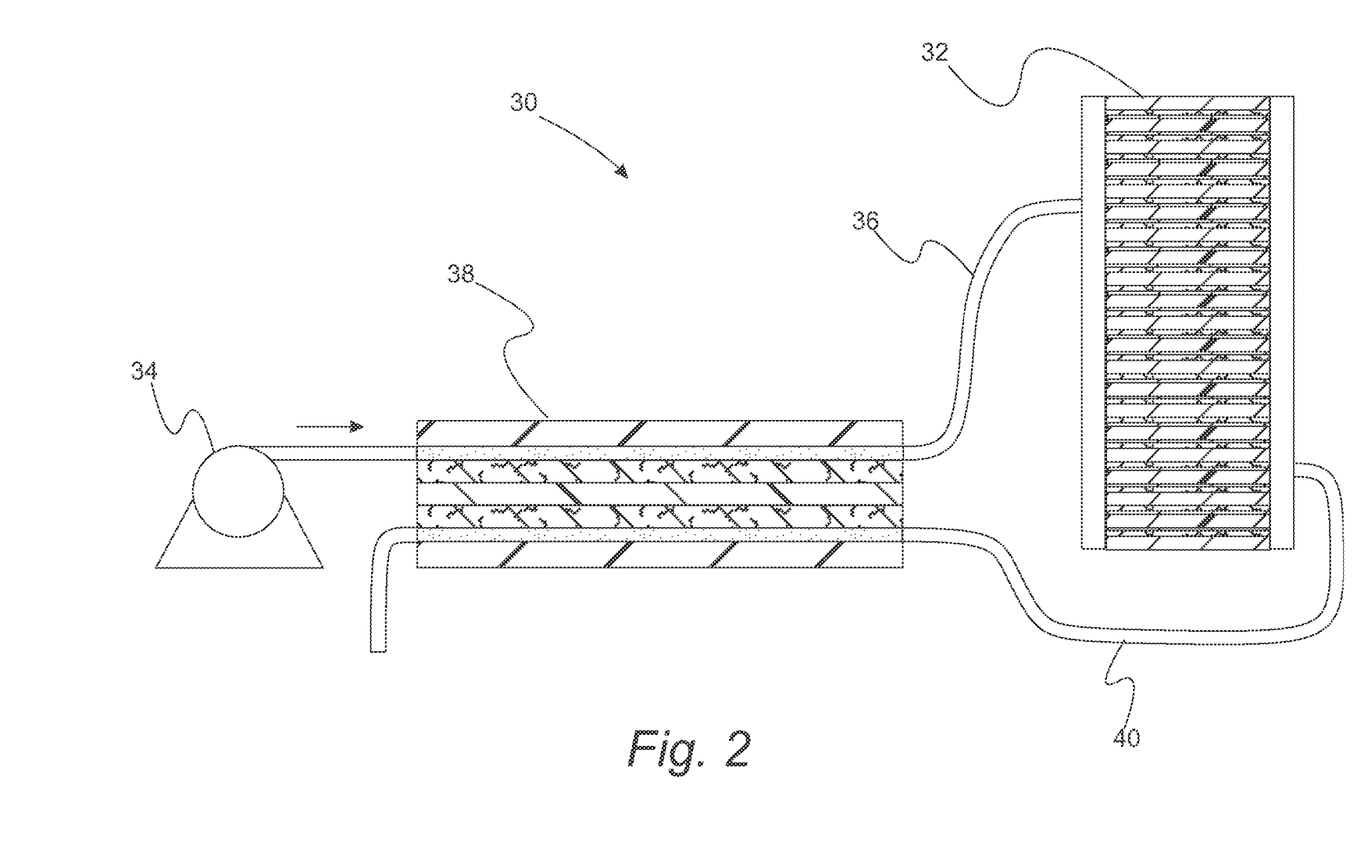
FIG. 2 provides a schematic of a fuel cell system including a membrane humidifier assembly for humidifying a cathode inlet airflow to a fuel cell stack.

With reference to FIG. 2, a schematic of a fuel cell system incorporating a membrane humidifier assembly that includes an embodiment of a grafted porous membrane is provided. Fuel cell system 30 includes fuel cell stack 32. Compressor 34 provides a flow of air to the cathode side of the stack 32 on a cathode input line 36. The flow of air from the compressor 34 is sent through membrane humidifier assembly 38 to be humidified. A cathode exhaust gas is output from the stack 32 on a cathode output line 40. The cathode exhaust gas includes a considerable amount of water vapor and/or liquid water as a by-product of the electrochemical process in the fuel cell stack 32. As is well understood in the art, the cathode exhaust gas can be sent to membrane humidifier assembly 38 to provide the humidification for the cathode inlet air on the line 36.

Figure 3:
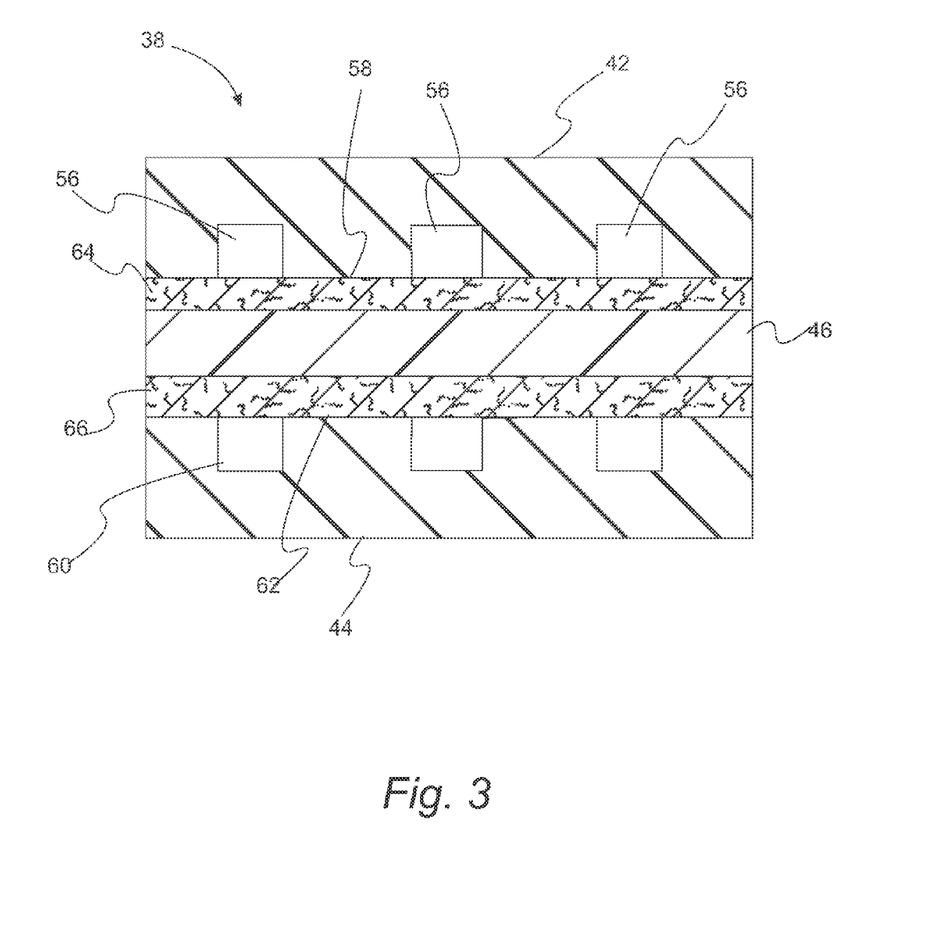
FIG. 3 is a schematic cross section of a membrane humidifier assembly perpendicular to the flow of gas to a first flow field plate.

With reference to FIG. 3, a schematic cross section of a membrane humidifier assembly is provided. The membrane humidifier of this embodiment may be used in any application in which it is desirable to transfer water from a wet gas to a dry gas such as the fuel cell system of FIG. 1. Membrane humidifier assembly 38 includes first flow field plate 42 adapted to facilitate flow of a first gas to membrane humidifier assembly 38. Membrane humidifier assembly 38 also includes second flow field plate 44 adapted to facilitate flow of a second gas thereto. In a refinement, first flow field plate 42 is a wet plate and second flow field plate 44 is a dry plate. Polymeric membrane 46 is disposed between the first flow field plate 42 and second flow field plate 44. First flow field plate 42 includes a plurality of flow channels 56 formed therein. The channels 56 are adapted to convey a wet gas from the cathode outlet of the fuel cell to an exhaust (not shown). It should be appreciated that any conventional material can be used to form the first flow field plate 42. Examples of useful materials include, but are not limited to, steel, polymers, and composite materials, for example. Second flow field plate 44 includes a plurality of flow channels 60 formed therein. The channels 60 are adapted to convey a dry gas from a source of gas (not shown) to the cathode inlet of the fuel cell. As used herein, wet gas means a gas such as air and gas mixtures of $O_2$, $N_2$, $H_2O$, $H_2$, and combinations thereof, for example, that include water vapor and/or liquid water therein at a level above that of the dry gas. Dry gas means a gas such as air and gas mixtures of $O_2$, $N_2$, $H_2O$, and $H_2$, for example, absent water vapor or including water vapor and/or liquid water therein at a level below that of the wet gas. It is understood that other gases or mixtures of gases can be used as desired. It should be appreciated that any conventional material can be used to form the dry plate 44 such as steel, polymers, and composite materials, for example. In a refinement, a diffusion medium or diffusion layer 64 is disposed adjacent the first flow field plate 42 and abuts the lands thereof. Similarly, a diffusion medium or diffusion layer 66 is disposed adjacent the dry side plate 44 and abuts the lands thereof. The diffusion media 64, 66 are formed from a resilient and gas permeable material such as carbon fabric, paper, polyester and glass fiber, for example.

Figure 4:
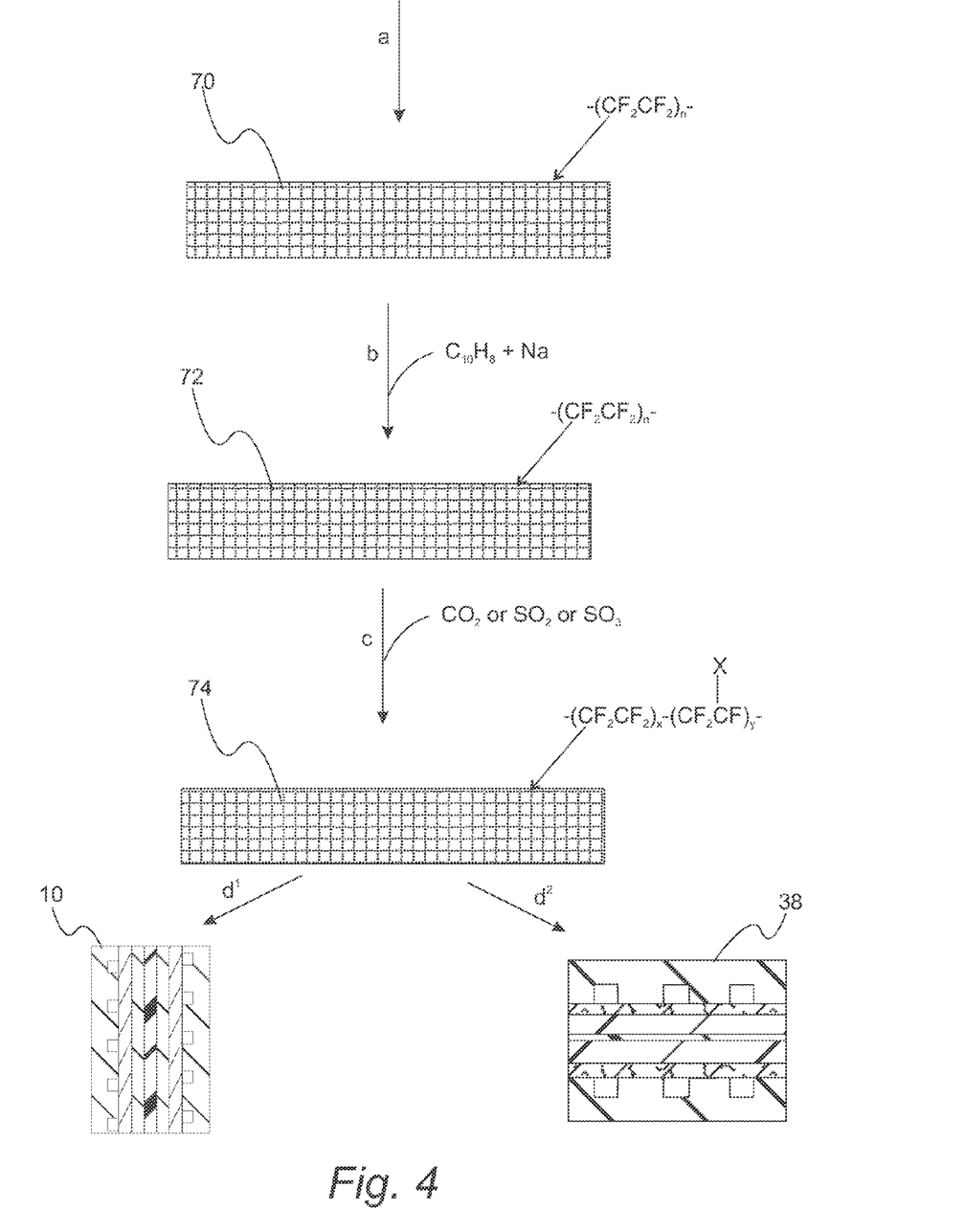
FIG. 4 is a schematic flowchart illustrating a method of making a modified solid fluorinated polymer.

With reference to FIG. 4, a schematic flow chart illustrating a method for forming a membrane for fuel cell and water transport applications is provided. In step a), a solid fluorinated polymer 70 is provided. In this context, solid means that it is not liquid and capable of holding its shape for an extended period of time (e.g., several hours to days). Such solid materials may be crystalline, amorphous, or combinations thereof. In a refinement, the solid fluorinated polymer is a polymeric membrane. In another refinement, the solid fluorinated polymer is a perfluorinated polymer. Typically, the solid fluorinated polymer includes repeating $CF_2$—$CF_2$ groups and is generally described by the following formula:

where n is on average from about 20 to 1000. In a refinement, n is on average from 100 to 800. In a particularly useful variation, the solid fluorinated polymer is porous. Such porous fluorinated polymer typically has a void volume from about 10 to about 95 percent. The term "void volume" as used herein means the volume percent of a sample that is empty via the inclusion of pores in the sample. In a refinement, the void volume is from 30 to 60 percent. A particularly useful porous solid fluorinated polymer is an expanded polytetrafluoroethylene.

In step b), the solid fluorinated polymer is contacted with a sodium-naphthalenide solution to form a treated fluorinated solid polymer 72. The sodium-naphthalenide solution includes sodium-naphthalenide dispersed or dissolved in a solvent. Useful solvents include aprotic solvents such as ethers (e.g., tetrahydrofuran). In a refinement, the sodium-naphthalenide solution includes sodium-naphthalenide in an amount from about 0.05 to 1 moles/liter.

Figure 5:
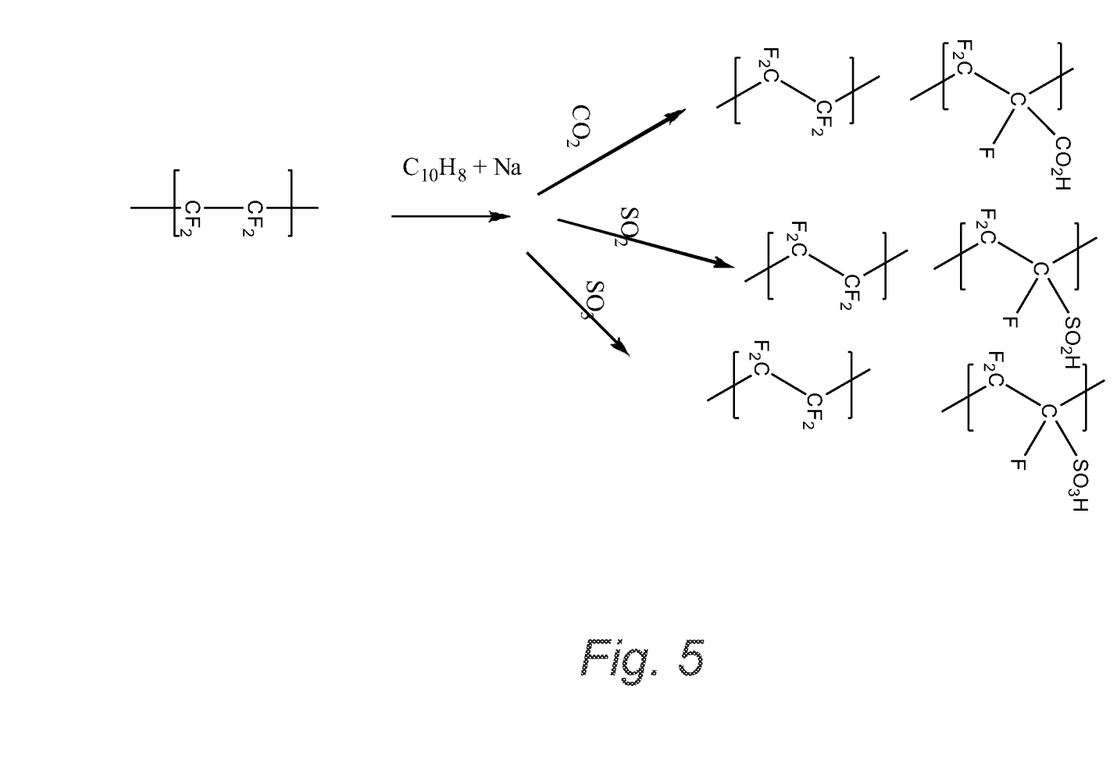
FIG. 5 provides a reaction scheme for forming the grafted polymers.

In step c), the treated fluorinated solid polymer is contacted with carbon dioxide, sulfur dioxide, or sulfur trioxide to form a solid grafted fluorinated polymer 74. Carbon dioxide can be used in the form of dry ice. The reaction occurring in step c) is generally described by the reaction set forth in FIG. 5. In step $d^1$), the solid grafted fluorinated polymer is advantageously incorporated into a fuel cell 10 as part of the ion-conducting membrane while in step $d^2$), the solid grafted fluorinated polymer is incorporated into a humidifier 38 as part of the water transfer membrane.

The following examples illustrate the various embodiments of the present invention. Those skilled in the art will recognize many variations that are within the spirit of the present invention and scope of the claims.

Expanded Polytetrafluoroethylene (ePTFE) with Carboxylic Acid Groups.

Figure 6:
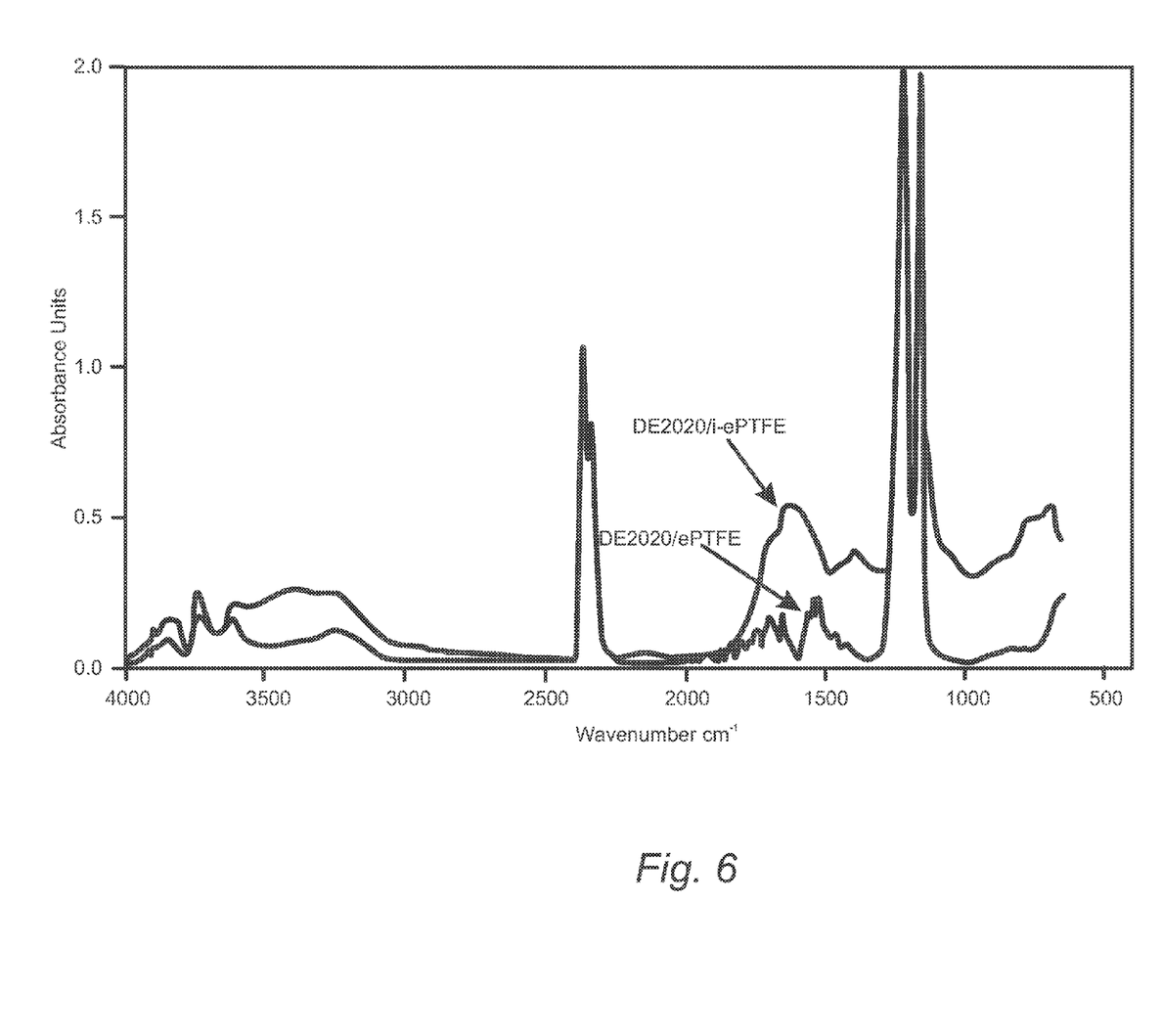
FIG. 6 provides FTIR-ATR of grafted —COOH group on ePTFE, comparing to untreated ePTFE.

Reaction of Expanded Polytetrafluoroethylene with Sodium Naphthalenide ($Na^+$—$[C_{10}H_8]^-$) and then Dry Ice. Expanded polytetrafluoroethylene (ePTFE, Donaldson Tetratex 1326, 15-microns thick, 0.7 g) is stretched onto a square, glass-filled polytetrafluoroethylene frame (6-inches by 6-inches). Tetrahydrofuran is distilled from blue, sodium benzophenone ketyl under argon and collected into two, 250-mL Schlenk flasks under argon. Into the first Schlenk flask is collected 50-mL of freshly distilled THF under argon and into the second Schlenk flask is collected 100 mL of THF under argon. To the first Schlenk flask with 50 mL of THF is then added naphthalene (3.25 g, 0.02539 mol), sodium (0.65 g, 0.2826 mol), and then a magnetic stir bar under argon. The mixture is allowed to stir 16 hours at 23° C. and the mixture turns from clear to black with time. Into a glove bag under nitrogen is placed the two Schlenk flasks, one with the sodium-naphthalenide in THF and the other with 100 mL of THF, an 8-inch by 8-inch Pyrex baking dish, and the ePTFE stretched on the frame. To the baking dish is added 25-mL of the black sodium-naphthalenide solution and then the ePTFE stretched on the frame is immersed in contact with the black sodium naphthalenide solution. The remaining 25 mL of black sodium naphthalenide solution is then poured on top of the stretched ePTFE such that the entire ePTFE on the frame is immersed and in contact with the black solution for about 10 seconds. If exposure to the black sodium naphthalenide solution is too long, holes form in the ePTFE, which is to be avoided. Into a second 8-inch by 8-inch Pyrex baking dish is added pulverized dry ice such that the entire bottom of the dish is covered with dry ice. The dish with dry ice is then transferred into the glove bag under a positive nitrogen pressure and then the 100 mL of THF from the second Schlenk flask is added to the dish. The brown-black treated ePTFE on the frame is then transferred to the baking dish with the dry ice and THF such that the entire treated ePTFE stretched on the frame is immersed in the dry ice-THF mixture. After 30 minutes, the treated ePTFE on the frame is then washed by immersion in water, then in 2 M sulfuric acid for 16 hours, then extensively with water, and then in ethanol. The air-dried, treated ePTFE is then washed with toluene and then allowed to air dry. The treated ePTFE is analyzed using a Bruker VERTEX 70 spectrometer under a nitrogen purge, and ATR-FTIR (attenuated total reflectance-Fourier transform infrared) spectra are collected from 4000 to 400 $cm^{-1}$ with a spectral resolution of 4 $cm^{-1}$. As shown in FIG. 6, the treated ePTFE has an absorbance at 1693 $cm^{-1}$ which is indicative of ePTFE-attached COOH groups, while a spectrum of the untreated ePTFE has no detectable intensity in this region. FIG. 6 provides an FTIR-ATR of grafted —COOH groups on the treated ePTFE and not on the untreated ePTFE. The highlighted spectrum is evidence of grafted —COOH functional group.

The treated ePTFE with carboxy groups readily becomes imbibed with ionomer dispersion (e.g., DuPont NAFION® DE2020 or with GM 700EW). Without the grafted functional groups, the ePTFE does not become imbibed well with GM 700EW ionomer dispersion.

Figure 7:
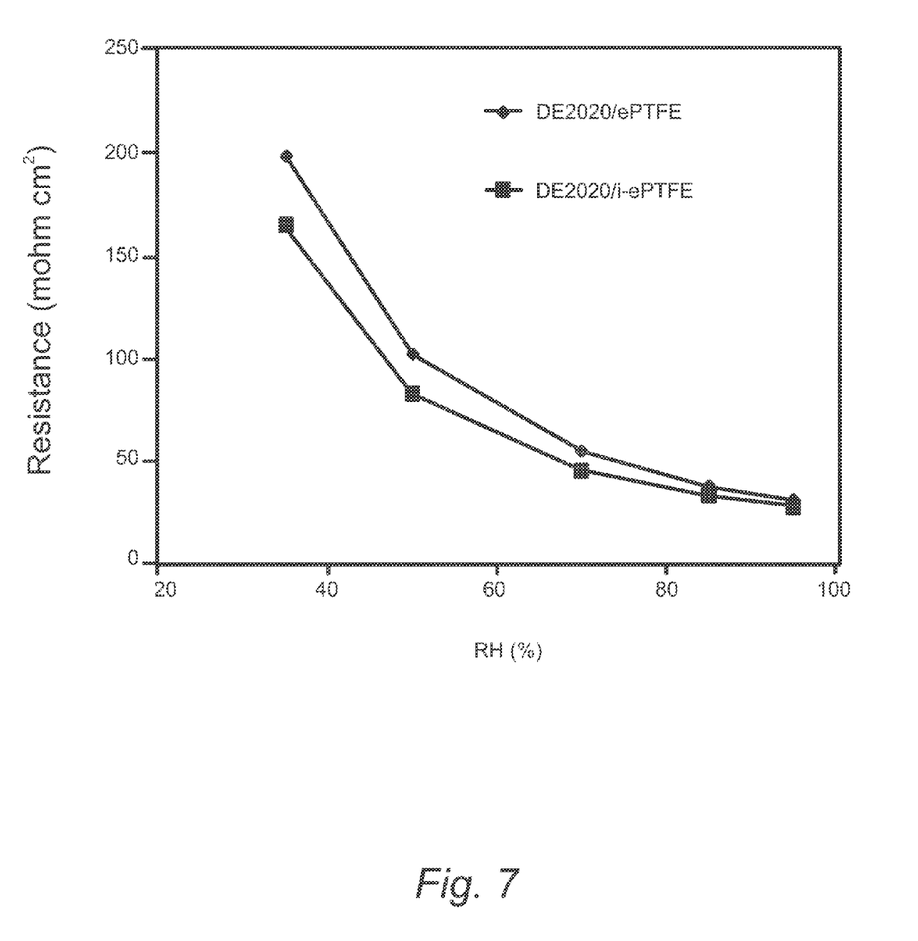
FIG. 7 provides the through-plane resistance of PEMs with untreated ePTFE (DE2020/ePTFE), with function group (—COOH) grafted ePTFE (DE2020/i-ePTFE), and without ePTFE.

Using an Erichsen coater operated at 12.5 mm per second, GM 700EW ionomer diluted with a 3:2 ratio of 1-propanol and water to 10 wt. % solids is applied to a fluoro-ethylene-propylene-KAPTON® film (FEP-KAPTON® film, American Durofilm) using a 3-mil Bird applicator (Paul N. Gardner Co.). The sodium-naphthaleneide treated ePTFE with carboxy groups stretched on a tetrafluoroethylene frame is laid down on top of the wet draw-down film of ionomer solution and then the treated ePTFE immediately becomes wet with imbibed ionomer. The frame is removed from the coated ePTFE, and a 1-mil film of polyester film-adhesive tape (Lamart Corp.) is used as a shim on the 3-mil Bird applicator to apply a second coating of 10 wt. %-ionomer dispersion on top of the treated ePTFE imbibed with ionomer. The composite membrane is then dried at 140° C. for 16 hours. The 12-micron dried and annealed membrane is removed from the FEP-KAPTON® backer film and tested in a hydrogen air fuel cell. By comparison, untreated ePTFE used as received does not completely imbibe with the 10 wt. % ionomer dispersion like that of the treated ePTFE with carboxy groups. FIG. 7 provides the through-plane resistance measurements of PEMs with untreated ePTFE (DE2020/ePTFE), with functional groups (—COOH) grafted to ePTFE (DE2020/i-ePTFE), and without ePTFE.

Similar ePTFE treatments are carried out using sulfur dioxide gas and sulfur trioxide to attach sulfinic acid and sulfonic acid groups to the sodium-naphthalene treated ePTFE. Sulfur dioxide from a lecture bottle is bubbled into cold tetrahydrofuran to form an $SO_2$ saturated solution. Sulfur trioxide (Sigma-Aldrich) is cautiously added to cold tetrahydrofuran to form a complex.

The ePTFE is treated first with naphthalene-sodium solution and then with the THF with $SO_2$ and $SO_3$, respectively. The treated ePTFE then has sulfinate or sulfonate groups.

The carbonation reaction of naphthalene-sodium is described in L. F. Fieser and M. F. Fieser, Reagents for Organic Synthesis, Volume 1, John Wiley & Sons, New York, 1967, pages 711-712. Although naphthalene adds only one atom of sodium to form a radical cation, carbonation of 1 mole of naphthalene-sodium at −70° C. is attended with disproportionation to give one-half mole each of naphthalene and a mixture of the 1,4- and 3,4-dicarboxylic acids [D. E. Paul, D. Lipkin, and S. I. Weissman, *J. Amer. Chem. Soc.*, 78, 116 (1956)]. Lyssy isolated and established the configurations of several components of the mixture [Th. M. Lyssy, *J. Org. Chem.*, 27, 5 (1962)]. The reaction of naphthalene-sodium with ePTFE has not been determined. However, metallation to form carbanions is at least one reaction taking place.

A regular catalyst coated membrane (CCM) type of membrane electrode assembly (MEA) is made by using two pieces of catalyst coated diffusion media bonded with a polyelectrolyte membrane (PEM). Carbon paper substrate with micro porous layer (MPL) is used as the gas diffusion media. A catalyst solution containing Pt/Vulcan catalyst with a loading of 0.4 mg Pt/cm$^2$ is coated on the gas diffusion media. After drying, the two pieces of catalyst coated diffusion media are bonded onto both sides of a membrane prepared by a hot pressure molding at a temperature of 295° F., and 200 psi compression pressure to form a CCM MEA. The obtained MEA has a 50 cm$^2$ active area.

Membrane through-plane proton transport resistance is measured using electrochemical (AC) impedance spectra technique. The AC impedance tests are obtained using a -Zahner iM6e Impedance Measurement Unit (Zahner Messtechnik, Germany) with a Zaher PP240 booster (Zahner Messtechnik, Germany), at a constant voltage of +0.2 V with a perturbation amplitude of 1 mV. The frequency ranges from 1 Hz to 20 kHz, while taking 20 frequency points per decade, and integrating over 20 periods per frequency point (acquisition time=10 minutes/spectrum). Five spectra are obtained at each test condition to check for reproducibility. The detail method to determine membrane through-plane resistance is discussed elsewhere. (R. Jiang, C. Mittelsteadt, C. Gittleman, J. Electrochem. Soc., 156 (2009) B1440).

The through-plane membrane resistance comparison is shown in FIG. 7. The membrane with —COOH graft-treated ePTFE has lower resistance than that with the untreated ePTFE. The grafted functional groups on ePTFE increase the proton concentration in PEMs. Because —COOH groups provided extra proton conduction sites for proton transport, the higher proton conduction media concentration facilitates higher proton transport in membranes. Membrane resistance is reduced for PEMs with functional groups grafted to the ePTFE reinforcement, which can be attributed to the higher proton concentration in the membrane, and also the better imbibement of ionomer materials into the ePTFE micro-porous structure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   providing a solid fluorinated polymer;
   contacting the solid fluorinated polymer with a sodium-naphthalenide solution to form a treated fluorinated solid polymer; and
   contacting the treated fluorinated solid polymer with carbon dioxide, sulfur dioxide, or sulfur trioxide to form a solid grafted fluorinated polymer that includes appended $CO_2H$ or $SO_2H$ or $SO_3H$ groups.

2. The method of claim 1 wherein the solid fluorinated polymer is a polymeric membrane.

3. The method of claim 2 wherein the solid fluorinated polymer includes repeating $CF_2$—$CF_2$ groups.

4. The method of claim 2 wherein the solid fluorinated polymer is a perfluorinated polymer.

5. The method of claim 2 wherein the solid fluorinated polymer is porous.

6. The method of claim 5 wherein the solid fluorinated polymer has a void volume from about 10 to about 95 percent.

7. The method of claim 5 wherein the solid fluorinated polymer is an expanded polytetrafluoroethylene.

8. The method of claim 5 further comprising imbibing an ion-conducting polymer into the solid grafted fluorinated polymer to form a supported membrane.

9. The method of claim 8 further comprising incorporating the supported membrane into a fuel cell or a water transfer device.

10. The method of claim 1 wherein the sodium-naphthalenide solution includes sodium-naphthalenide in an amount from about 0.05 to about 1 moles/liter.

* * * * *